(12) United States Patent
Kim et al.

(10) Patent No.: US 9,204,330 B2
(45) Date of Patent: Dec. 1, 2015

(54) METHOD AND APPARATUS FOR GENERATING TRAFFIC INDICATOR MAP IN WIRELESS COMMUNICATION SYSTEM

(75) Inventors: Suhwook Kim, Anyang-si (KR); Bonghoe Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 110 days.

(21) Appl. No.: 14/004,345

(22) PCT Filed: Jan. 4, 2012

(86) PCT No.: PCT/KR2012/000078
§ 371 (c)(1),
(2), (4) Date: Sep. 10, 2013

(87) PCT Pub. No.: WO2012/134042
PCT Pub. Date: Oct. 4, 2012

(65) Prior Publication Data
US 2014/0029600 A1 Jan. 30, 2014

Related U.S. Application Data

(60) Provisional application No. 61/469,779, filed on Mar. 30, 2011.

(51) Int. Cl.
H04W 4/00 (2009.01)
H04W 24/10 (2009.01)
H04W 74/08 (2009.01)
H04W 84/12 (2009.01)

(52) U.S. Cl.
CPC ............. *H04W 24/10* (2013.01); *H04W 74/08* (2013.01); *H04W 84/12* (2013.01)

(58) Field of Classification Search
None
See application file for complete search history.

(56) References Cited

U.S. PATENT DOCUMENTS 7,729,377 B2 * 6/2010 Seo et al. .................. 370/468
7,808,949 B2 * 10/2010 Seo et al. .................. 370/329
7,885,230 B2 * 2/2011 Seo et al. .................. 370/329

(Continued)

FOREIGN PATENT DOCUMENTS

CN 101502044 A 8/2009
CN 101861715 A 10/2010

OTHER PUBLICATIONS

He et al., "A novel scheduled power saving mechanism for 802.11 wireless lans," IEEE Transactions on Mobile Computing, Oct. 2009, vol. 8, No. 10, pp. 1368-1383.

*Primary Examiner* — Michael J Moore, Jr.
(74) *Attorney, Agent, or Firm* — Birch, Stewart, Kolasch & Birch, LLP (57) ABSTRACT

The present invention relates to a method and an apparatus for generating a traffic indicator map in a wireless communication system, as described below, and the method comprises the following steps: dividing into at least one group a virtual bitmap comprising displayed values of association IDs (AIDs) of stations that are coupled to an access point; saving a first portion, which includes a first display value but does not include a first AID for receiving data from the access point, in a virtual bitmap of each of the divided groups as an offset value in a bitmap control field, the first portion including a first display value but not including a first AID for receiving data from the access point; setting a second portion from the virtual bitmap of each of the divided groups as a partial virtual bitmap field, the second portion being the portion excluding the first portion; and generating the traffic indicator map including the bitmap control field and the partial virtual bitmap field for each of the divided groups.

10 Claims, 11 Drawing Sheets

(56) References Cited

U.S. PATENT DOCUMENTS

| | | |
|---|---|---|
| 2008/0259866 A1 | 10/2008 | Kostic et al. |
| 2008/0298290 A1* | 12/2008 | Wentink .................. 370/311 |
| 2009/0010191 A1* | 1/2009 | Wentink .................. 370/311 |
| 2009/0016306 A1 | 1/2009 | Wang et al. |
| 2010/0265864 A1 | 10/2010 | He et al. |

* cited by examiner

| Element ID | Length | DTIM Count | DTIM Period | Bitmap Control | Partial Virtual Bitmap |
|---|---|---|---|---|---|
| 1 | 1 | 1 | 1 | 1 | 1 - 251 |

OCTETS :

| Element ID | Length | DTIM Count | DTIM Period =0x00 | Bitmap Control | DTIM Period | TIM Counter | Partial Virtual Bitmap |
|---|---|---|---|---|---|---|---|
| 1 | 1 | 1 | 1 | 1 | 1 | 1 | 1 - 249 |

OCTETS :

FIG. 7

| Element ID | Length | DTIM Count | DTIM Period =0x00 | Bitmap Control | DTIM Period | Partial Virtual Bitmap |
|---|---|---|---|---|---|---|
| 1 | 1 | 1 | 1 | 1 | 1 | 1 - 250 |

OCTETS :

METHOD AND APPARATUS FOR GENERATING TRAFFIC INDICATOR MAP IN WIRELESS COMMUNICATION SYSTEM

CROSS REFERENCE TO RELATED APPLICATIONS

This application is the National Phase of PCT/KR2012/000078 filed on Jan. 4, 2012, which claims priority under 35 U.S.C. 119(e) to U.S. Provisional Application No. 61/469,779 filed on Mar. 30, 2011, all of which are hereby expressly incorporated by reference into the present application.

BACKGROUND OF THE INVENTION

1. Field of the Invention

The present invention relates to a wireless communication system and, more particularly, to a method and apparatus for generating a traffic indicator map.

2. Background Art

The Wireless Local Area Network (hereinafter referred to as WLAN) technology standard has been established by the IEEE (Institute of Electrical and Electronic Engineers) 802.11 Standardization Association. Among the IEEE 802.11 standards, IEEE 802.11a/b uses a frequency band of 2.4 GHz or 5 GHz, so as to provide a transmission (or transport) efficiency of 11 Mbps (IEEE 802.11b) or 54 Mbps (IEEE 802.11a). IEEE 802.11g may provide a transmission efficiency of 54 Mbps by applying an OFDM (Orthogonal Frequency Divisional Multiplexing) scheme. Additionally, IEEE 802.11n may provide a transmission efficiency of 300 Mbps by applying a MIMO-OFDM scheme. Furthermore, the IEEE 802.11n may also provide a maximum transmission efficiency of 600 Mbps by using a maximum channel bandwidth of 40 Mhz.

In accordance with the enlargement of base of the WLAN and the variation in the applications using the WLAN, the request for a new WLAN system supporting more enhanced performance than the performance supported by the IEEE 802.11n system. A VTH (Very High Throughput) WLAN system corresponds to one of the most recently proposed IEEE 802.11 WLAN systems for supporting a data processing rate of 1 Gps or more. In order to establish standardization of the VHT WLAN system, research on schemes and methods, such as 8×8 MIMO for the standardization of the VHT WLAN system, a channel bandwidth of 80 MHz or higher, a PLCP (Physical Layer Convergence Procedure) format for efficiently supporting the co-existence of each station, such as VHT-STA, HT-STA, and Legacy-STA, and so on, is being thoroughly carried out in IEEE 802.11ac operation groups.

Additionally, standardization regulating the WLAN in a TV white space is being realized with IEEE 802.11af. The TV white space includes a channel, which is allocated to a broadcast channel, which is authorized for the usage of a cognitive radio device, and generally refers to a band of 512-698 MHz.

SUMMARY OF THE INVENTION

An object of the present invention is to provide a method and apparatus for generating a traffic indicator map in a wireless communication system, as described above.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

A first technical aspect of the present invention is to provide a method of an access point for generating a traffic indicator map in a wireless communication system, the method for generating the traffic indicator map including the steps of dividing a virtual bitmap into one or more groups, wherein the virtual bitmap comprises flag of Association IDs (AIDs) of stations associated with the access point; in the virtual bitmap of each of the divided groups, storing a first portion in a bitmap control field as an offset value, the first portion including a first flag yet not including a first AID that is intended to receive data from the access point; in the virtual bitmap of each of the divided groups, configuring a second portion as a partial virtual bitmap field, the second portion excluding the first portion; and generating a traffic indicator map, the traffic indicator map including the bitmap control field and the partial virtual bitmap field respective to each of the divided groups.

A second technical aspect of the present invention is to provide a device generating a traffic indicator map in a wireless communication system, the device including an RF (Radio frequency) unit; and a processor, wherein the processor may divide a virtual bitmap into one or more groups, wherein the virtual bitmap comprises flag of Association IDs (AIDs) of stations associated with the device, may store a first portion in a bitmap control field as an offset value in the virtual bitmap of each of the divided groups, the first portion including a first flag yet not including a first AID that is intended to receive data from the access point, may configure a second portion as a partial virtual bitmap field in the virtual bitmap of each of the divided groups, the second portion excluding the first portion, and may generate a traffic indicator map, the traffic indicator map including the bitmap control field and the partial virtual bitmap field respective to each of the divided groups.

In the first and second aspects of the present invention, the second portion being configured as the partial virtual bitmap field may include one or more flag of an AID that is intended to receive data from the access point in a last octet.

Additionally, the first portion being stored as the offset value may be decided to include a number of flag corresponding to a multiple of two octets.

Also, the group configuration may be configured, so as to maximize the offset value in each group.

Moreover, the number of groups may be set to be equal to one, when the number of stations being associated with the access point is equal to or less than a predetermined value.

Furthermore, the traffic indicator map may further include a field indicating that the virtual bitmap is being configured of at least 2 or more groups; a field indicating an ith group to which the traffic indicator map corresponds; and a field indicating whether or not the traffic indicator map corresponds to a last group.

According to the present invention, even if the number of stations being associated with the access point is largely increased, the traffic indicator map may be capable efficiently supporting such increase.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BRIEF DESCRIPTION OF THE DRAWINGS

The drawings accompanying the description of the present invention are given to provide a more detailed understanding of the present invention. Herein, the accompanying drawings illustrate diverse exemplary embodiments of the present invention and are being provided to describe the principles of the present invention along with the description of the present invention.

DETAILED DESCRIPTION OF THE EMBODIMENTS

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

The specific terms used in the following description of the present invention are provided to facilitate the understanding of the present invention. And, therefore, without deviating from the technical scope and spirit of the present invention, such specific terms may also be varied and/or replaced by other terms.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

Herein, the embodiments of the present invention may be supported by at least one the disclosed standard documents for wireless access systems including the IEEE 802 system, the 3GPP LTE system, the LTE-A (LTE-Advanced) system, and the 3GPP2 system. More specifically, among the embodiments of the present invention, partial operation steps or structures of the present invention, which have been omitted from the description of the present invention in order to specify and clarify the technical scope and spirit of the present invention may also be supported by the above-described standard documents. Furthermore, the terms disclosed in the description of the present invention may be described based upon the above-mentioned standard documents.

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolved version of the 3GPP LTE system. The WiMAX may be described based upon the IEEE 802.16e standard (WirelessMAN-OFDMA Reference System) and the evolved IEEE 802.16m standard (WirelessMAN-OFDMA Advanced system). For the clarity in the description of the present invention, the present invention will be described based upon the 3GPP LTE system and the 3GPP LTE-A system. Nevertheless, the scope and spirit of the present invention will not be limited only to those of the 3GPP LTE system and the 3GPP LTE-A system.

Figure 1:
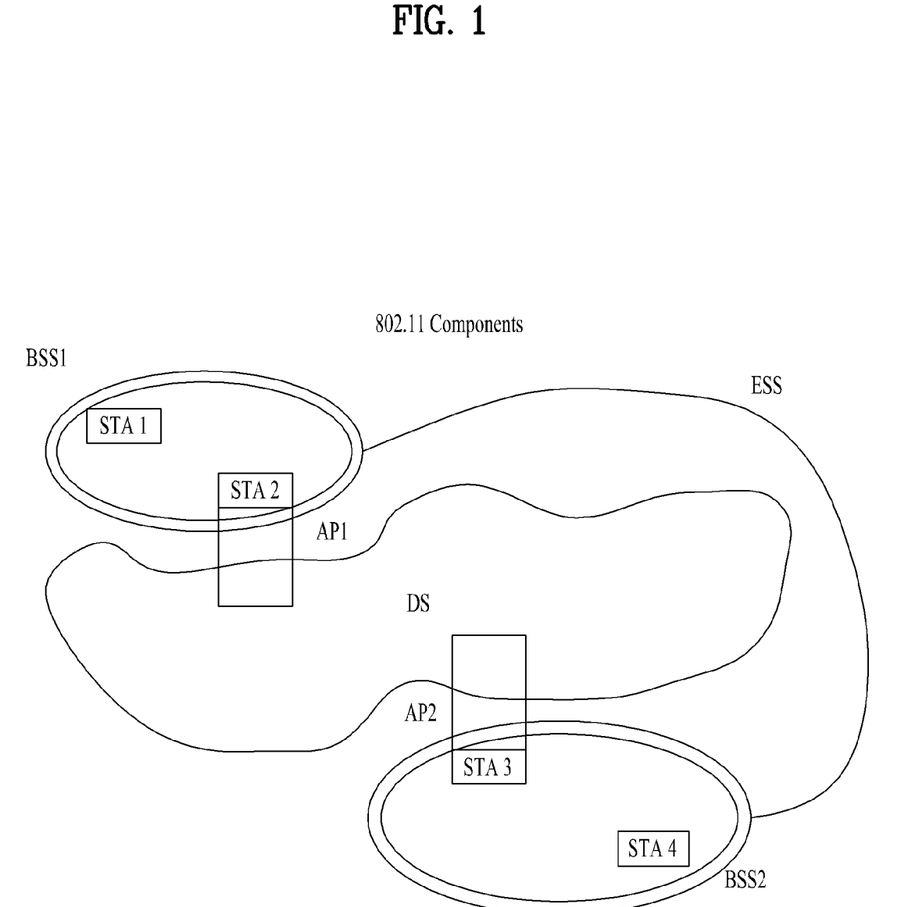
FIG. 1 illustrates a structure of a Wireless Local Area Network (WLAN) system.

FIG. 1 illustrates a structure of a Wireless Local Area Network (WLAN) system.

Referring to FIG. 1, the WLAN system includes one or more Basic Service Sets (hereinafter referred to as BSSs). The BBS corresponds to a group of Stations (hereinafter referred to as STAs), which are successfully synchronized with one another, and which can communicate with one another, and does not correspond to a concept indicating a specific region (or area or zone).

The STA corresponds to an arbitrary functional medium including a Physical Layer interface respective to Medium Access Control (MAC) and wireless media according to the regulations of the IEEE 802.11 standard, and, in a broader meaning, the STA includes both AP and Non-AP STA. Among the STAs, a mobile user equipments being manipulated by the user corresponds to a non-AP STA, and, when simply referred to as an STA, the STA may also indicate a non-AP STA. The non-AP STA may also be referred to as other terms, such as a terminal, a Wireless Transmit/Receive Unit (WTRU), a User Equipment (UE), a Mobile Station (MS), a Mobile Terminal, a Mobile Subscriber Unit, and so on.

Additionally, the AP corresponds to a functional entity providing access to a Distribution system (DS) to an STA (Associated Station), which is associated with the corresponding AP, by passing through a wireless medium. In addition to the term Access Point, the AP may also be referred to as Base Station (BS), Node-B, BTS (Base Transceiver System), or site controller. In FIG. 1, STA2 and STA3 correspond to the AP.

The DS corresponds to a mechanism allowing one AP to communication with another AP. The AP may transmit a frame through the DS for STAs being coupled with BBSs, which are managed by the AP. Additionally, in case any one STA has moved (or shifted) to another BSS, the frame may be transported (or delivered) through the DS. Moreover, the AP may transmit (or deliver) a frame to an external network, such as a wired network, through the DS. Such DS is not mandatorily required to correspond to a network, and, as long as the DS can provide a predetermined distribution system regulated by IEEE 802.11, the structure (or format) of the DS will not be limited. For example, the DS may correspond to a wireless network, such as a mesh network or may correspond to a physical architecture (or structure) that can connect the APs to one another.

The BSS may be divided into an Infrastructure BSS and an Independent BSS (IBSS).

The Infrastructure BSS includes one or more non-AP STAs, an AP providing a DS, and a DS connecting multiple APs to one another. In the infrastructure BSS, the AP manages the non-AP STAs of the BSS. In the infrastructure BSS including the AP, as a rule, the communication between the non-AP STAs should be realized by passing through the AP. However, in case a direct link is established, direct communication may also be performed between the non-AP STAs.

Conversely, the Independent BSS (IBSS) corresponds to a BSS operating in an Ad-Hoc mode. Since the IBSS does not include any AP, the IBSS does not include any Centralized Management Entity. More specifically, in the IBSS, the non-AP STAs are managed in a distributed manner. In the IBSS, all of the STAs may be configured of mobile STAs, and, since access to the DS is not authorized, a self-contained network may be established.

Multiple infrastructure BSSs may be connected to one another through the DS. The multiple infrastructure BSSs may be connected to one another through the DS is collectively referred to as an Extended Service Set (ESS). The STAs being included in the ESS may communicate with one another, and, within the same ESS, a non-AP STA may travel (or shift) from one BSS to another BSS while performing uninterrupted communication.

Although the description of the exemplary embodiments of the present invention is given based upon the operations being performed in the infrastructure BSS, as shown in FIG. 1, the present invention will not be limited only to the examples set forth herein.

In the above-described IEEE 802.11 WLAN, the STA basically determines the status of the medium, and, in order to perform frame reception, the STA decode the contents that are being received from the channel and then analyzes the decoded contents. However, since the difference between the power consumption in the receiving state and the power consumption in the transmitting state is not very large, persistently maintaining the receiving state may become a large burden to the STA, which operates on battery power.

In the IEEE 802.11 standard, a Power management mode is provided in order to extend (or prolong) the durability of the STA. In the power management mode, the STA may operate in an Active mode, which corresponds to an Awake state, or may operate in a sleep mode, which corresponds to a Doze state. In the active mode, in the STA, normal operations such as frame transception (or transmission/reception) or channel scanning may be performed. Conversely, in the sleep mode, the STA is in a state that cannot perform transmission/reception (or transception) and, therefore, consumes an extremely small amount of power.

If the STA operates in the sleep mode for a longer period of time, the amount of consumed power reduces even more, and, therefore, the durability of the STA is extended. However, in the sleep mode, since frame transception cannot be performed, the STA cannot continuously operate only in the sleep mode. Accordingly, in order to allow the STA to be aware that a frame, which the corresponding STA is intended to receive, exists, the STA periodically shifts from the sleep mode to the active mode, so as to receive a beacon frame from the AP. The AP uses a Traffic Indicator Map (hereinafter referred to as TIM) element of the beacon frame in order to notify each STA of whether or not a frame that is to be received exists. The TIM element may be broadly divided into two different types, one being a TIM, which is used for notifying unicast frames, and the other being a DTIM, which is used for notifying multicast/broadcast frames.

Once the STA is informed through the TIM element of the beacon frame that the AP is carrying a frame, which is intended to be received by the corresponding STA, the corresponding STA passes through a contending process, so as to transmit a PS-Poll frame. After receiving the PS-Poll frame, depending upon the circumstances, the AP may select any one of an Immediate Response and a Deferred Response and may, then, operate accordingly.

Figure 2:
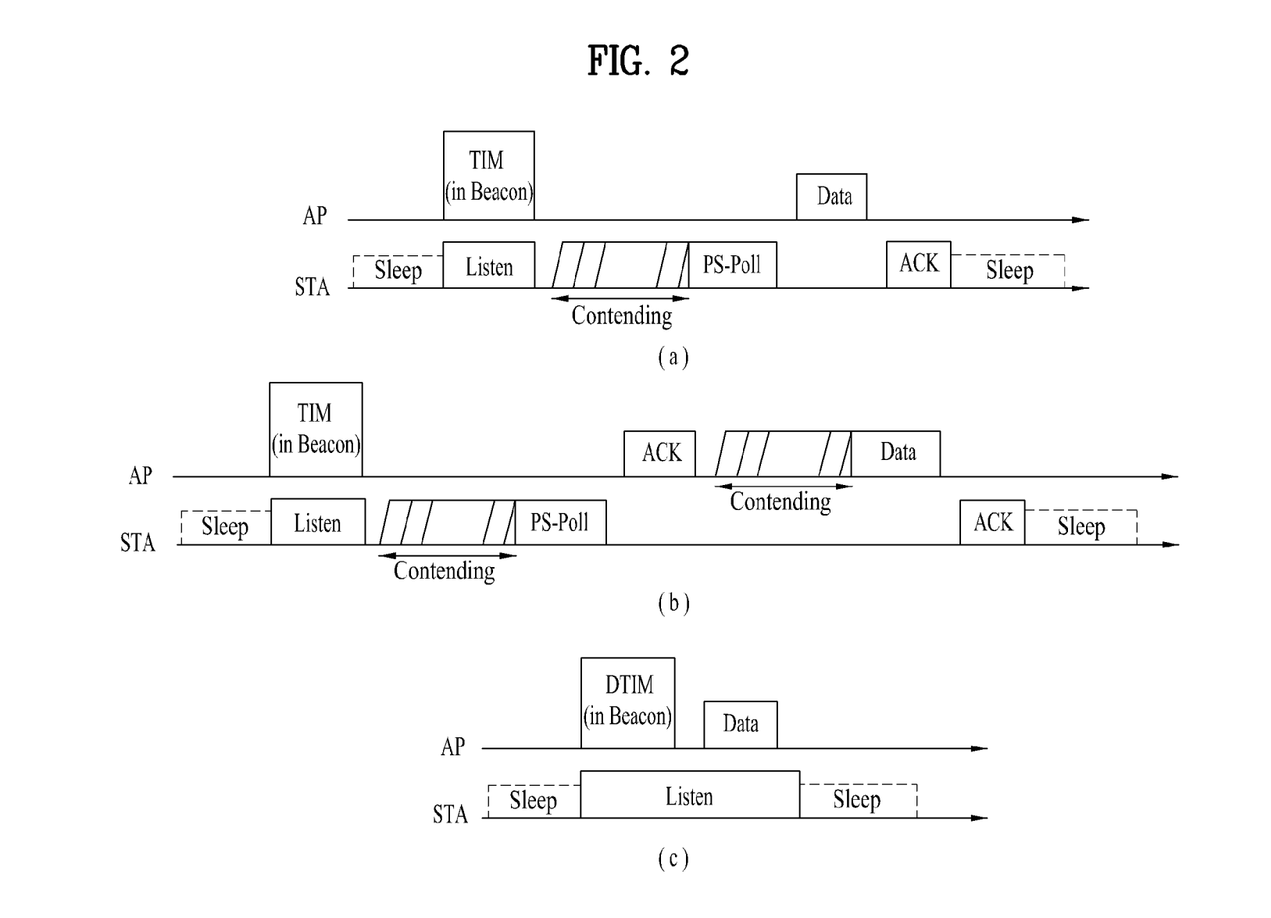
FIG. 2 illustrates a drawing for describing an Immediate Response and a Deferred Response.

FIG. 2 illustrates a drawing for describing an Immediate Response and a Deferred Response. Referring to FIG. 2(a), the STA operating in the sleep mode shifts to the active mode, so as to receive the beacon frame including the TIM element. After identifying the presence of a frame that is to be received through the TIM element, the STA performs contending, so as to transmit the PS-Poll. After receiving the PS-Poll, the AP immediately transmits a data frame after a SIFS (short inter frame space). Herein, the SIFS refers to a time having the shortest deference (or delay time), which is defined in the IEEE 802.11 standard for the acknowledgement of a data frame. When the data frame is normally (or successfully) received, the STA transmits an ACK frame after an SIFS and, then, shifts back to the sleep mode.

After receiving the PS-Poll frame, in case the AP has failed to prepare a data frame during the SIFS time period, the AP may select the Deferred Response. More specifically, as shown in FIG. 2(b), after first transmitting the ACK frame, once the data frame is ready, the AP performs contending and then transmits the prepared data frame to the STA. After successfully receiving the data frame, the STA transmits an ACK frame and, then, shifts back to the sleep mode.

In case of the DTIM, as shown in FIG. 2(c), a data frame transmission process is immediately performed after the beacon frame without the transmission/reception (or transception) of a PS-Poll, and all of the corresponding STAs operating in the active mode may receive the transmitted data frame.

Figure 3:
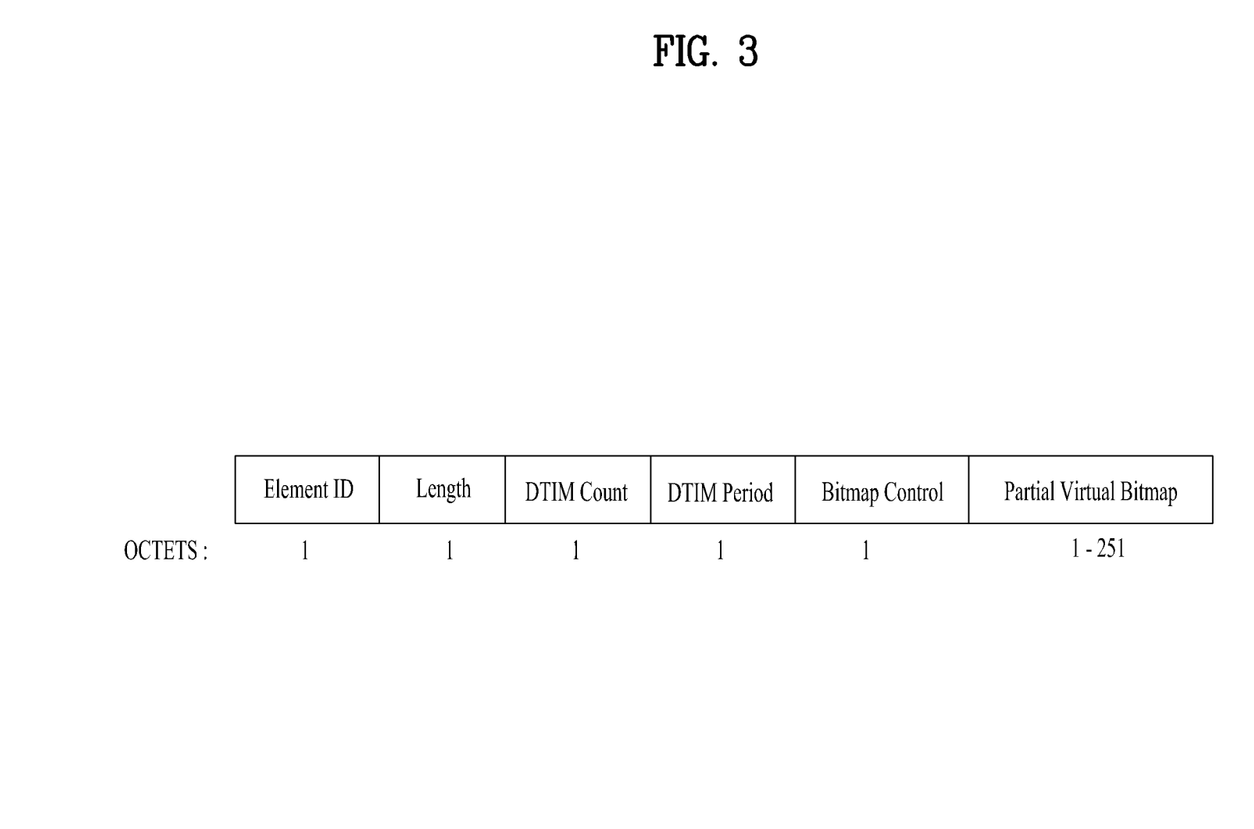
FIG. 3 illustrates a TIM element, which is defined in an IEEE 802.11.

FIG. 3 illustrates a TIM element, which is defined in an IEEE 802.11.

Referring to FIG. 3, an Element ID field corresponds to a field indicating that the corresponding frame is a TIM element.

A Length field indicates the total (or overall) length of a DTIM Count field, a DTIM Period field, a Bitmap Control field, a Partial Virtual Bitmap field, in addition to the Element ID and Length fields. The maximum value of this field is 256, and the unit of this field corresponds to an octet.

The DTIM Count field indicates whether or not the current TIM element corresponds to a DTIM. More specifically, when this field value is equal to 0, this indicates that the current TIM corresponds to the DTIM. If the current TIM does not correspond to the DTIM, the DTIM Count field indicates the number of beacon frames that is to be transmitted until the next DTIM including the current frame.

The DTIM Period field indicates the interval of how many TIMs according to which the DTIM is being transmitted. More specifically, the DTIM Period field indicates the number of beacon intervals between the DTIMs.

The Bitmap Control field indicates two types of information. A first bit of the Bitmap Control field is used for indicating that a multicast/broadcast frame exists. And, the remaining 7 bits are using for indicating an offset. The offset is used for indicating the AID that is to receive the frame along with the Partial Virtual Bitmap field with more efficiency, and this will be described in more detail later on.

The Partial Virtual Bitmap field carries information having compressed a Virtual Bitmap indicating to which particular station the frame being buffered to the current AP is to be transmitted. Herein, the Virtual Bitmap consists of a flag value of each AID in accordance with an Association Identifier (hereinafter referred to as AID) order of the STA, which is associated with the AP. More specifically, in case of an AID receiving a frame that is buffered to the STA, the flag value is set to 1, and, otherwise, the flag value is set to 0. For example, in case a 4th bit of the virtual bitmap is set to 1, this indicates that a frame that is to be transmitted to an STA having an AID of 4 is buffered to the AP. Herein, the AID corresponds to an identifier, which is being allocated when an STA is associated with the AP. An AID is uniquely used in one BSS and may have a value within the range of 1~2007. In the IEEE 802.11 standard, 14 bits are allocated for the AID, and a maximum of 16383 bits may be used, and the value within the range of 2008~16383 is being reserved.

Figure 4:
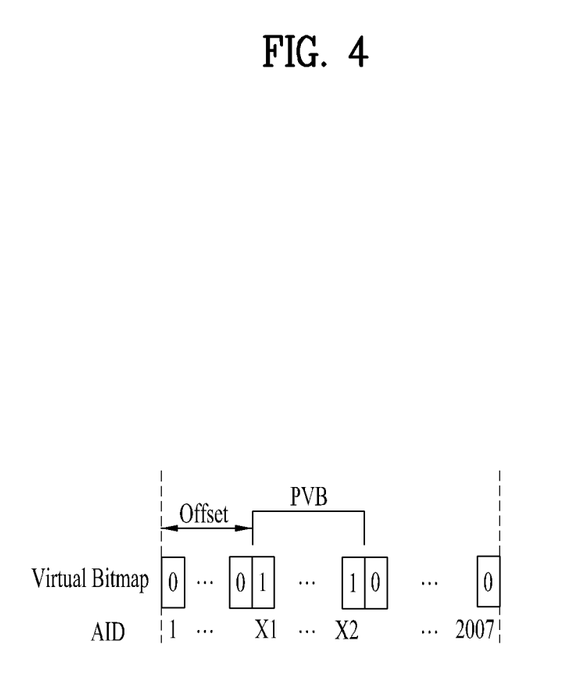
FIG. 4 illustrates a relation between a partial virtual bitmap and offset of the TIM element.

FIG. 4 illustrates a relation between a partial virtual bitmap and offset of the TIM element.

As shown in FIG. 4, a virtual bitmap is configured of flag values of 2007 AIDs of an STA being associated with the AP. Since the flag value corresponding to AID X1, X2 is set to 1, this indicates an STA that is intended to each data being buffered to the AP.

In the virtual map, in case a flag having the value of 0 is consecutively aligned, it would be inefficient to include the whole virtual bitmap, which is configured of 2007 AIDs, in the TIM element. Therefore, in the IEEE 802.11 standard, this problem is resolved by using an offset. More specifically, a front portion (starting from AID 1 to X1-1) of the virtual bitmap that does not include the first AID (X1), which is intended to receive the data buffered to the access point, is represented as the offset. And, a portion of the virtual map (starting from X1 to X2), which is included in the flag having the value of 1, is set as the Partial Virtual Bitmap (hereinafter referred to as PVB) field.

In FIG. 4, although the flag values corresponding to the beginning and the end of the PVB are set to be equal to 1 for simplicity, this is merely exemplary. More specifically, in the IEEE 802.11 standard, since the virtual bitmap is expressed in octet units in the PVB, in a position corresponding to the 8th bit of the first octet of the PVB, a flag value being equal to 1 may be marked (or indicated) (in this case, a virtual bitmap being included in the PVB may begin with 0, 0, 0, 0, 0, 0, 0, 1, ~). Similarly, in a position corresponding to the first bit of the last octet of the virtual bitmap configuring the PVB, a flag value being equal to 1 may be indicated (in this case, a virtual bitmap being included in the PVB may end with ~, 1, 0, 0, 0, 0, 0, 0, 0). This is also applied to FIG. 6 and FIG. 9 according to each of the exemplary embodiments of the present invention, which will be described later on.

As described above, in IEEE 802.11, information used by the AP to indicate the STAs that are intended to receive the buffered data through the TIM element may be notified to the STA. However, since the current TIM element supports only a maximum of 2007 STAs, there may be some difficulties in directly applying this principle in machine to machine (also referred to as M2M) communication, which has recently been viewed as the next generation communication technology, without any modifications.

More specifically, first of all, in the M2M, a large number of STAs may be associated with one AP. Therefore, it may be highly likely that more than 2007 AIDs, which are available in the current TIM element, are to be used. Secondly, in the M2M, there are many applications supporting low transmission rate (or speed). Accordingly, if the bitmap size of the PVB field of the TIME element becomes too large, a relatively long transmission time may be required, which may then lead to an increase in the power consumption of the STAs. Therefore, it may be required to reduce the bitmap size of the TIM element. Finally, the M2M STAs generally receive and transmit small amount of data on a periodic basis. Since the cycle period tend to be very long, there are very few STAs having a frame that is to be received from the AP for only one beacon interval.

Therefore, even if the number of STAs being associated with the AP increases largely, a TIM element that is capable of supporting such large increase and that is, at the same time, capable of efficiently configuring a bitmap is required to be proposed.

First Embodiment

Figure 5:
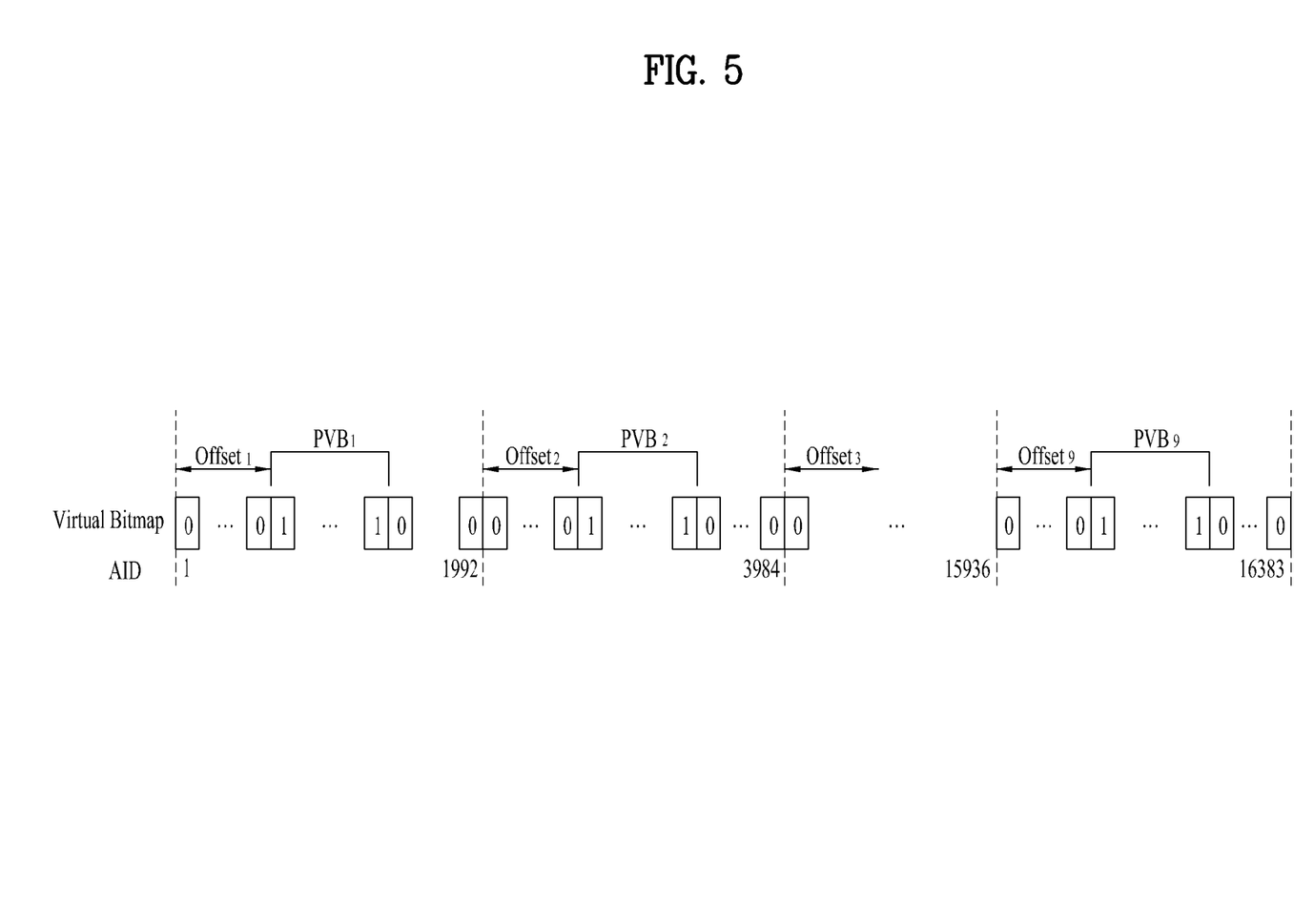
FIG. 5 illustrates a method for generating a TIM element according to a first exemplary embodiment of the present invention.

FIG. 5 illustrates a method for generating a TIM element according to a first exemplary embodiment of the present invention.

Referring to FIG. 5, in case of the first embodiment, a virtual bitmap being configured of the flag value of an AID may be divided into multiple sections each having the same size. Then, with respect to each section, an offset and PVB may be decided by using the method described with reference to FIG. 4.

More specifically, a maximum of 16383 AIDs may be used, as described below, since the corrected PVB of the TIM element, which is used in the first embodiment of the present invention, has the size of 249 octets, the virtual map of one section may correspond to a maximum of 249*8=1992 bits. Therefore, when the total size of the virtual bitmap, which corresponds to 16383 bits, is divided by 1992 bits, the number of sections may be decided to equal to 9, as shown in FIG. 5.

However, the reference value 1992 for dividing this section is not an absolute value, and, therefore, variations may be made by the AP.

Figure 6:
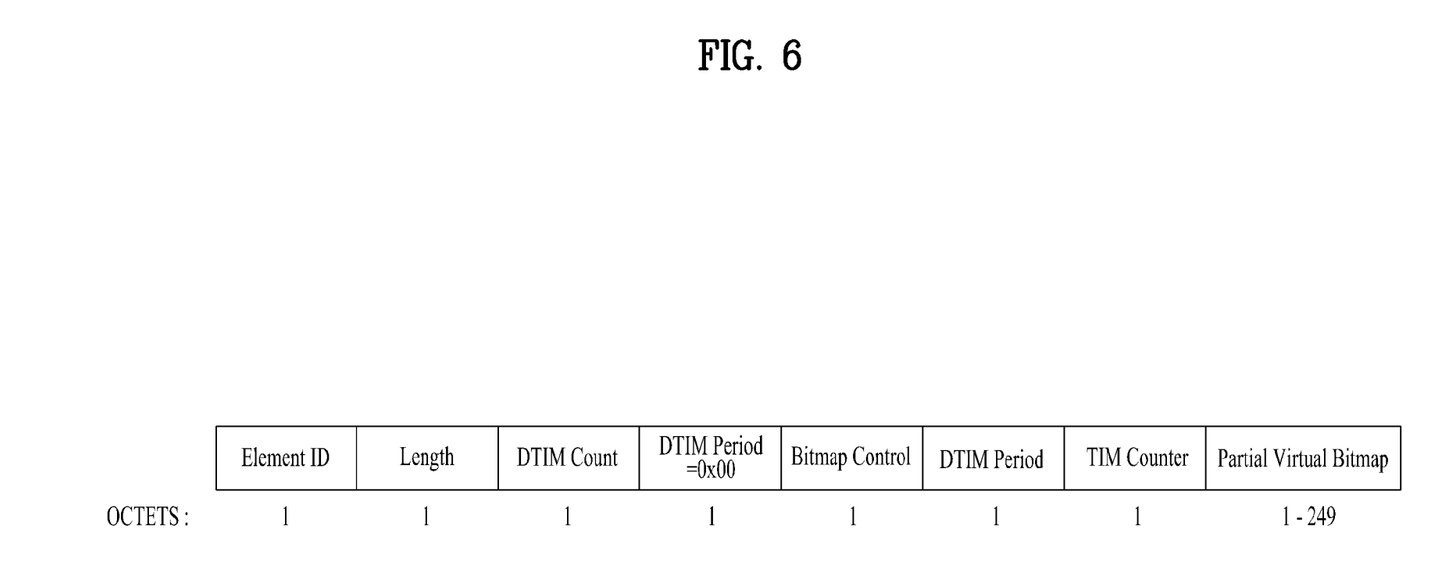
FIG. 6 illustrates a TIM element format being applied to a case corresponding to the first exemplary embodiment of the present invention.

FIG. 6 illustrates a TIM element format being applied to a case corresponding to the first exemplary embodiment of the present invention.

Referring to FIG. 6, the Element ID field, the Length field, the DTIM Count field, the Bitmap control field, the DTIM Period field, and the Partial Virtual Bitmap field perform the same functions as those defined in the conventional standard.

A DTIM Period=0x00 field defines a reserved operation respective to the value 0 in the DTIM period field of the conventional standard. More specifically, when the DTIM Period=0x00 field has the value of 0, this may indicate that the current TIM element corresponds to the corrected TIM element, which is shown in FIG. 6.

A TIM counter field indicates to which section the current TIM element corresponds, among the divided sections. For example, in case the TIM counter is equal to 2, this may indicate that the current TIM element corresponds to the second section (AID 1993-3984) shown in FIG. 5. Accordingly, the stations may use the information of the field, so as to recognize the virtual bitmap configuration in the second section. Additionally, when the TIM element is received, the STA may use the TIM counter field, so as to identify to which ith section the received TIM element corresponds and, then, to configure the virtual bitmap, only when the ith section corresponds to a section to which the AID of the corresponding STA belongs.

The Partial Virtual Bitmap field is decided to have the size of 249 octets in order to maintain the size of the conventional TIM element.

Figure 7:
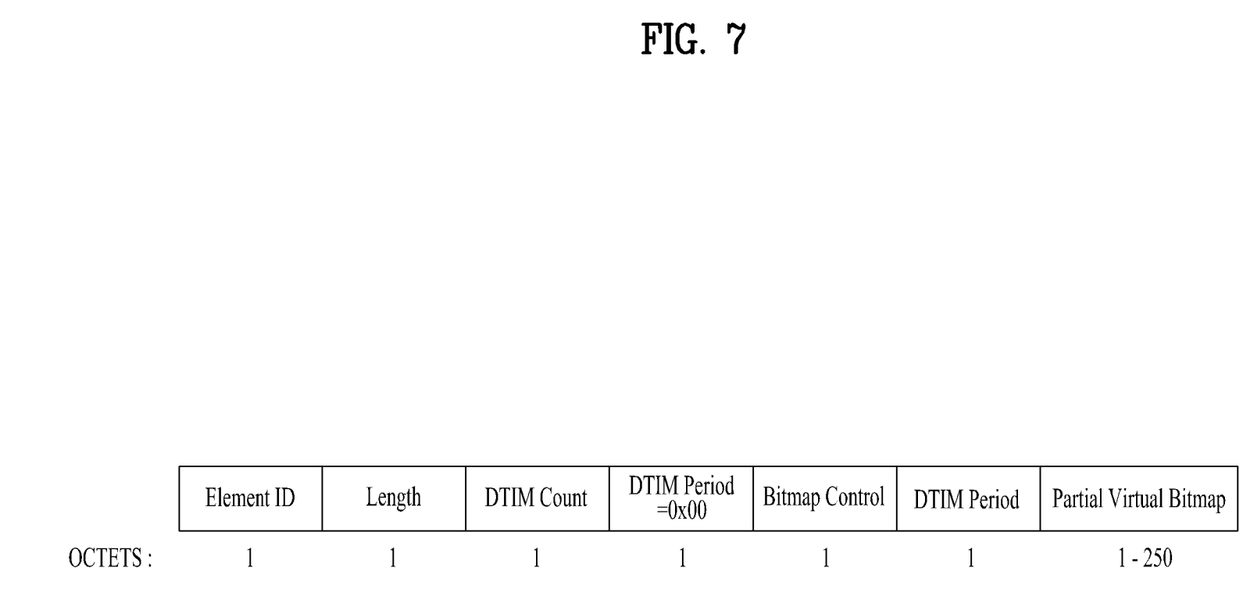
FIG. 7 illustrates another example of a TIM element format being applied to a case corresponding to the first exemplary embodiment of the present invention.

Meanwhile, the AP may consecutively and sequentially perform transmission starting from the TIM element corresponding to the first section to the TIM element corresponding to the last section, and, depending upon the circumstances, one or more sections that are to be urgently transmitted may be transmitted firsthand, and the remaining sections may be separately transmitted by using a frame, such as TIM broadcast. Additionally, if the virtual bitmaps of a specific section all has the same value of 0, the TIM element of the corresponding section may be omitted. Herein, when the TIM elements are consecutively and sequentially transmitted, since the information indicating the corresponding section is not crucially necessary, the TIM counter field may be omitted. FIG. 7 shows an example of the TIM counter field being omitted from the TIM element of FIG. 6. In this case, the 1 octet being used as the TIM counter field may be used in the PVB so as to ensure a little more of the bitmap size.

Second Embodiment

Figure 8:
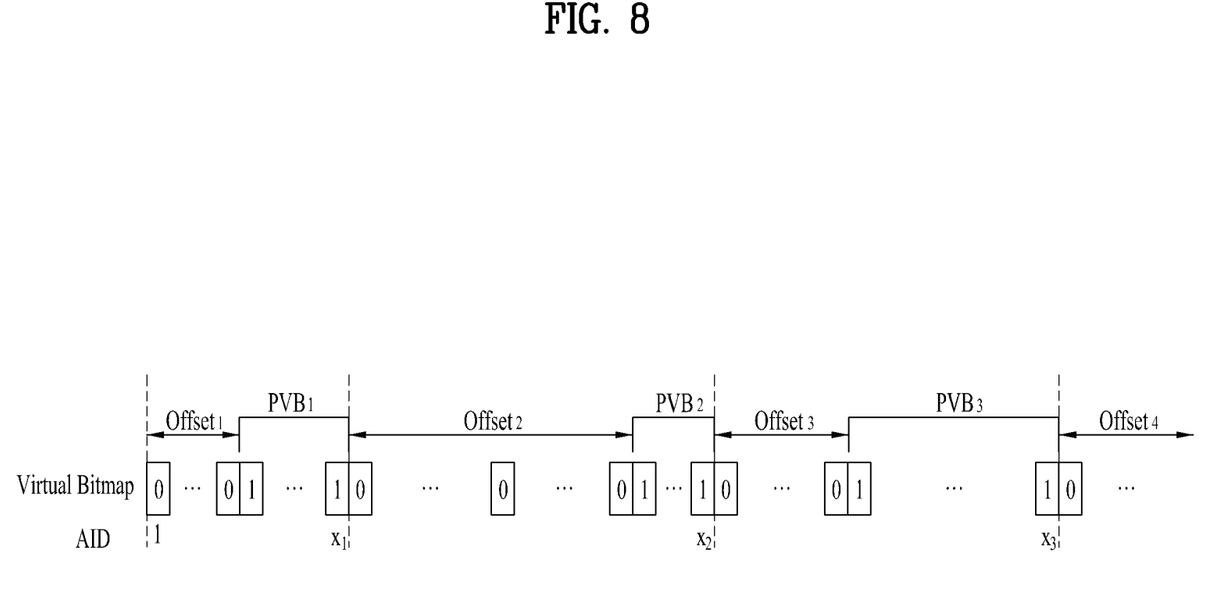
FIG. 8 illustrates a method for generating a TIM element according to a second exemplary embodiment of the present invention.

FIG. 8 illustrates a method for generating a TIM element according to a second exemplary embodiment of the present invention.

Referring to FIG. 8, in the second embodiment, it may be known that the offset is decided starting from the PVB and after. More specifically, the AP divides the virtual map into sections each having a different size, and, then, the AP decides the offset and PVB for each section. Herein, each section may be decided by using a method of maximizing the offset, so as to reduce the size of the respective virtual bitmap to a maximum extent.

In order to apply the above-described embodiment of the present invention, the TIM element of the conventional standard is required to be corrected, as shown in the first embodiment of the present invention. Hereinafter, the corrected TIM element will be described in detail.

Figure 9:
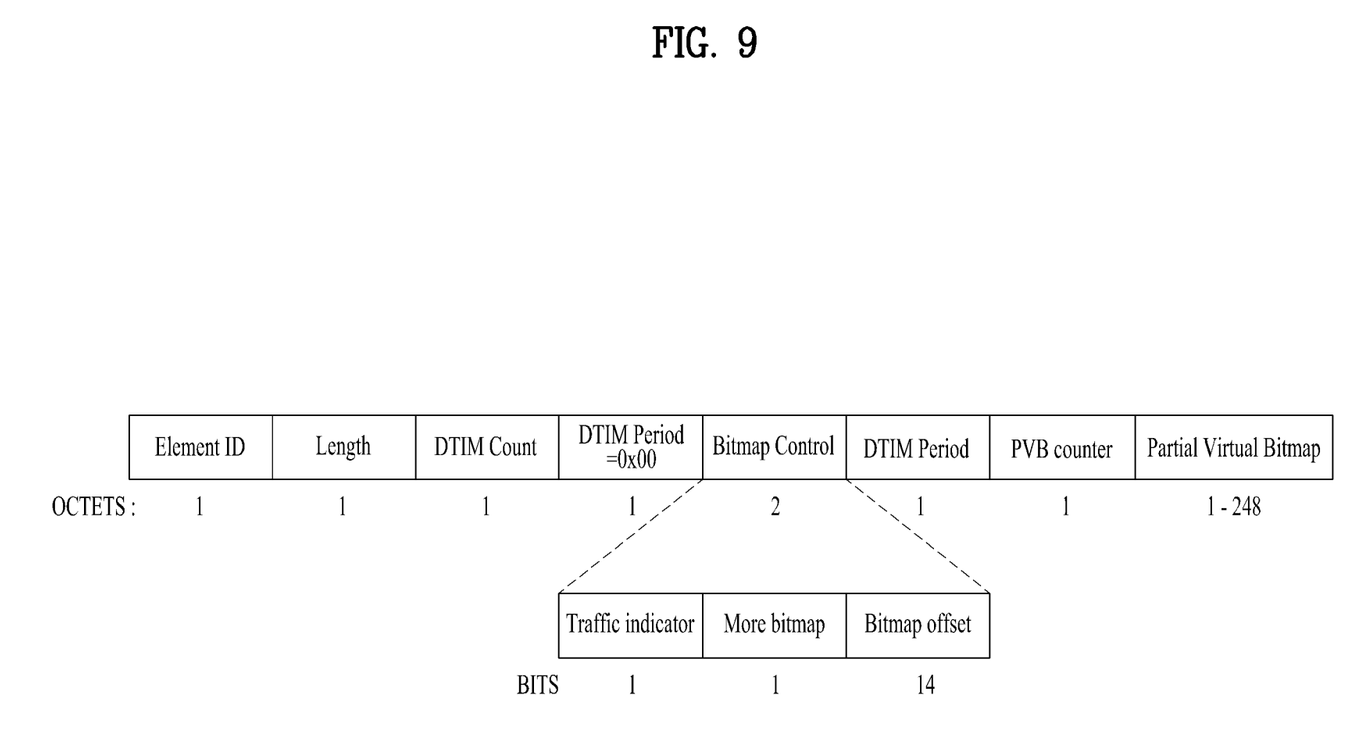
FIG. 9 illustrates a TIM element format being applied to a case corresponding to the second exemplary embodiment of the present invention.

FIG. 9 illustrates a TIM element format being applied to a case corresponding to the second exemplary embodiment of the present invention.

Referring to FIG. 9, the Element ID field, the Length field, the DTIM Count field, the DTIM Period field, and the Partial Virtual Bitmap field perform the same functions as those defined in the conventional standard.

A DTIM Period=0x00 field is identical to the one described in the first embodiment of the present invention.

Unlike in the related art standard, the Bitmap control field uses 2 octets. The Bitmap control field may include a Traffic indicator field, a More bitmap field, and a Bitmap offset field. The Traffic indicator field is used for notifying that a multicast/broadcast frame exists. And, the More bitmap field is used for indicating whether or not a virtual bitmap continuing from (or in succession to) the virtual bitmap indicated by the current TIM element exists. More specifically, in case a successive (or continuing) virtual bitmap exists, the More bitmap field may be expressed as 1, and in case such virtual bitmap does not exist, the More bitmap field may be expressed as 0. Since the size of the offset may be larger than that of the conventional offset, 14 bits are assigned to the Bitmap offset field As shown in the TIM counter field of the first embodiment of the present invention, the PVB counter field indicates to which section the current TIM element corresponds.

The Partial Virtual Bitmap field is decided to have the size of 248 octets in order to maintain the size of the conventional TIM element.

Figure 10:
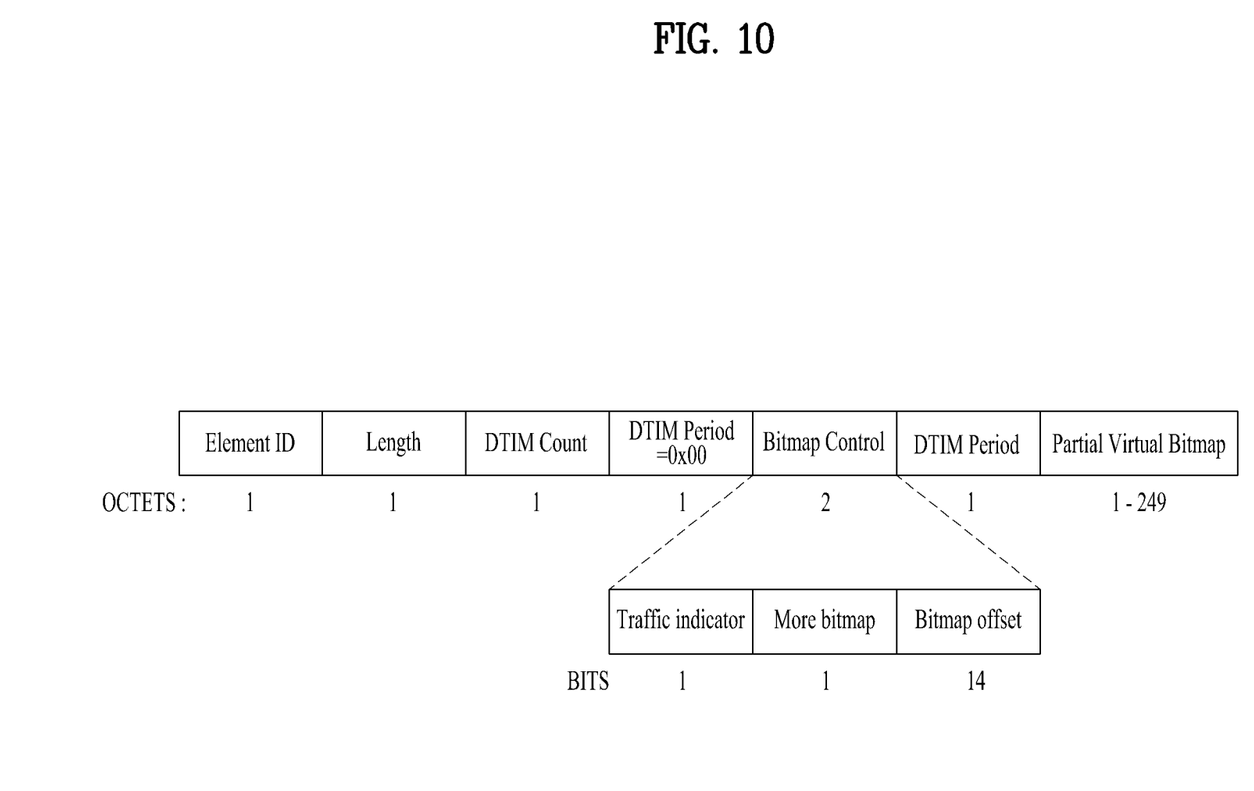
FIG. 10 illustrates another example of a TIM element format being applied to a case corresponding to the second exemplary embodiment of the present invention.

Meanwhile, as described in the first embodiment of the present invention, the PVB counter field may be omitted in case the TIM elements are being sequentially transmitted. And, in this case, the TIM element format may be the same as shown in FIG. 10.

Figure 11:
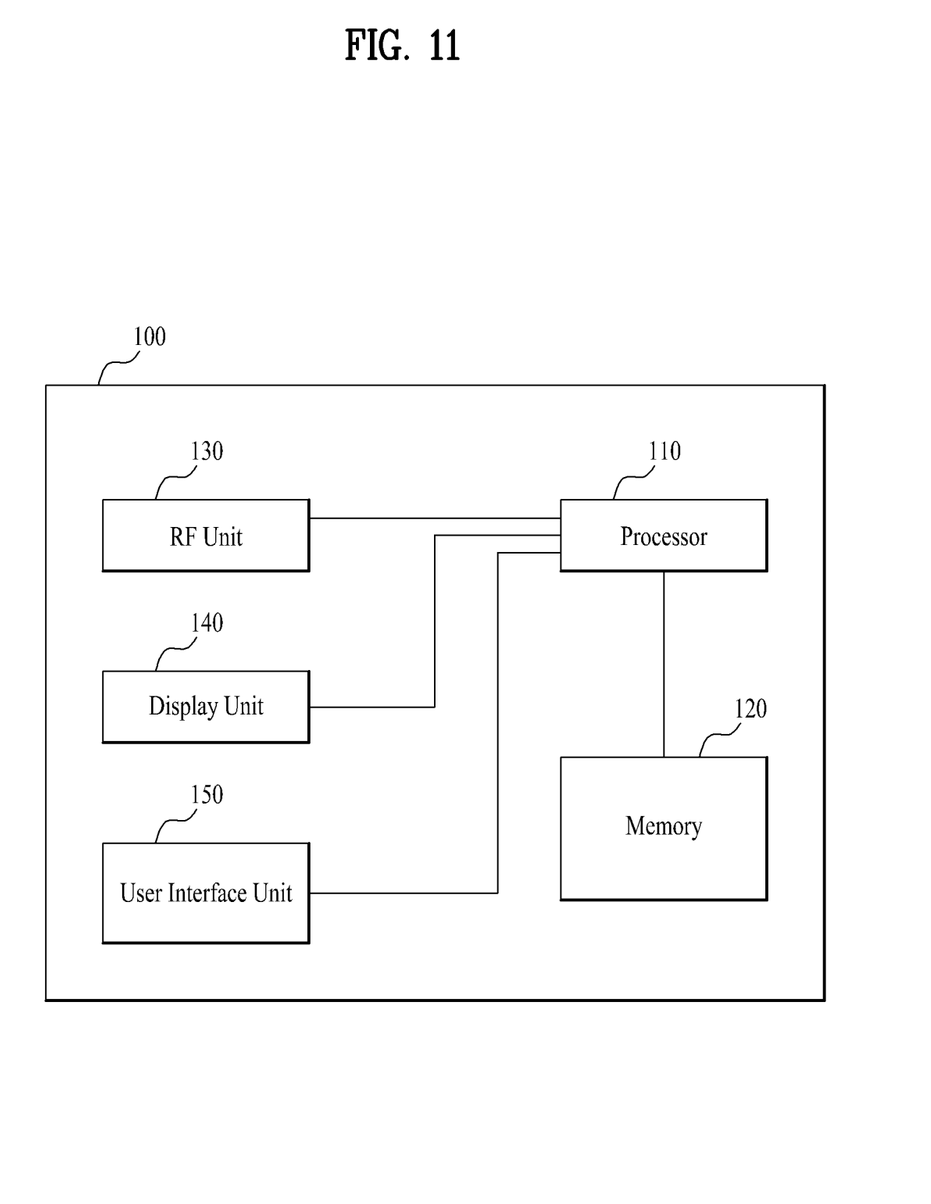
FIG. 11 illustrates a block view showing the structure of a device that can perform (or execute) the present invention.

FIG. 11 illustrates a block view showing the structure of a device, to which STA or AP may be applied, and which can perform (or execute) the present invention. As shown in FIG. 11, the device (100) includes a processor (110), a memory (120), a RF (Radio Frequency) unit (130), a Display unit (140), and a user interface unit (150).

A layer of a physical interface protocol is performed in the processor (110). And, the processor (110) provides a control plane and a user plane. The function of each layer is performed by the processor (110). In case the processor (110) is included in the AP, as described in the above-mentioned exemplary embodiments of the present invention, the TIM element may be generated and transmitted. Additionally, in case the processor (110) is included in the STA, the processor (110) may decode the above-described TIM element, so as to verify whether or not buffered data exist in the processor (110).

The memory (120) is electrically connected to the processor (110) and stores an operating system, applications, and general files.

If the device (100) corresponds to a user device, the display unit (140) may display diverse information. And, the display unit (140) may be realized by using as LCD (Liquid Crystal Display), OLED (Organic Light Emitting Diode) as disclosed herein. The user interface unit (150) may be configured by being combined with any one of the disclosed user interfaces, such as a keypad, a touchscreen, and so on.

The RF unit (130) is electrically connected to the processor (110) and either transmits or receives radio signals. The RF unit (130) may include a transmitting module and a receiving module.

The transmitting module may perform predetermined coding and modulation processes on the signal and/or data scheduled by the processor (110) and to be transmitted to the outside, thereby delivering the processed data to the antenna.

The receiving module may perform decoding and demodulation processes on a wireless signal received from the outside through the antenna, so as to recover the processed data to the original (or initial) state, thereby delivering the recovered data to the processor (110).

The above-described embodiments of the present invention may be implemented by using a variety of methods. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

The detailed description of the preferred embodiments of the present invention disclosed herein as described above is provided so that those skilled in the art can easily implement and realize the present invention. Although the embodiment of the present invention has been described with reference to the accompanying drawings, the described embodiment of the present invention is merely exemplary. Therefore, it will be apparent to those skilled in the art that various modifications and variations can be made in the present invention without departing from the spirit or scope of the inventions. For example, anyone skilled in the art may combine each component disclosed in the description of the embodiments of the present invention. Therefore, it is intended that the present invention covers the modifications and variations of this invention provided they come within the scope of the appended claims and their equivalents, and it is not intended to limit the present invention only to the examples presented herein.

Furthermore, the present invention may be realized in another concrete configuration (or formation) without deviating from the technical spirit and the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein. Furthermore, claims that do not have any explicit citations within the scope of the claims of the present invention may either be combined to configure another embodiment of the present invention, or new claims may be added during the amendment of the present invention after the filing for the patent application of the present invention.

The present invention relates to a wireless communication system, and, more particularly, the present invention may be applied to t device for generating a traffic indicator map.

What is claimed is:

1. In a method of an access point for generating a traffic indicator map in a wireless communication system, the method for generating the traffic indicator map comprises:
   dividing a virtual bitmap into one or more groups,
   wherein the virtual bitmap comprises flags of Association IDs (AIDs) of stations associated with the access point;
   storing a first portion in a bitmap control field as an offset value, the first portion including a first flag without including a first AID used to receive data from the access point, in the virtual bitmap of each of the one or more groups;
   configuring a second portion as a partial virtual bitmap field, the second portion excluding the first portion, in the virtual bitmap of each of the one or more groups; and
   generating a traffic indicator map including the bitmap control field and the partial virtual bitmap field respective to each of the one or more groups,
   wherein the first portion stored as the offset value includes a number of flags corresponding to a multiple of two octets.

2. The method of claim 1, wherein the second portion configured as the partial virtual bitmap field includes one or more flags of an AID used to receive data from the access point in a last octet.

3. The method of claim 1, wherein a group configuration is configured, so as to maximize the offset value in each of the one or more groups.

4. The method of claim 1, wherein a number of groups is set to be equal to one, when a number of stations being associated to the access point is equal to or less than a predetermined value.

5. The method of claim 1, wherein the traffic indicator map further comprises:
   a field indicating that the virtual bitmap is being configured as at least 2 or more groups;
   a field indicating an $i^{th}$ group to which the traffic indicator map corresponds; and
   a field indicating whether or not the traffic indicator map corresponds to a last group.

6. In a device generating a traffic indicator map in a wireless communication system, the device comprising:
   an RF (Radio frequency) unit; and
   a processor,
   wherein the processor is configured to:
   divide a virtual bitmap into one or more groups,
   wherein the virtual bitmap comprises flags of Association IDs (AIDs) of stations associated to the device,
   store a first portion in a bitmap control field as an offset value in the virtual bitmap of each of the one or more groups, the first portion including a first flag without including a first AID used to receive data from the access point,
   configure a second portion as a partial virtual bitmap field in the virtual bitmap of each of the one or more groups, the second portion excluding the first portion, and generate a traffic indicator map, the traffic indicator map including the bitmap control field and the partial virtual bitmap field respective to each of the one or more groups, wherein the first portion being stored as the offset value includes a number of flags corresponding to a multiple of two octets.

7. The device of claim 6, wherein the second portion being configured as the partial virtual bitmap field includes one or more flags of an AID used to receive data from the access point in a last octet.

8. The device of claim 6, wherein a group configuration is configured, so as to maximize the offset value in each of the one or more groups.

9. The device of claim 6, wherein a number of groups is set to be equal to one, when a number of stations being associated with the access point is equal to or less than a predetermined value.

10. The device of claim 6, wherein the traffic indicator map further comprises:
   a field indicating that the virtual bitmap is being configured as at least 2 or more groups;
   a field indicating an $i^{th}$ group to which the traffic indicator map corresponds; and
   a field indicating whether or not the traffic indicator map corresponds to a last group.

* * * * *